United States Patent
Mueller et al.

(10) Patent No.: US 6,855,445 B2
(45) Date of Patent: Feb. 15, 2005

(54) DEVICE FOR TREATING A FUEL/COOLANT MIXTURE

(75) Inventors: Jens Thomas Mueller, Munich (DE); Sven Schnetzler, Marburg/Lahn (DE); Peter Waitkat, Ulm (DE)

(73) Assignee: DaimlerChrysler AG, Stuttgart (DE)

( * ) Notice: Subject to any disclaimer, the term of this patent is extended or adjusted under 35 U.S.C. 154(b) by 448 days.

(21) Appl. No.: 09/919,608

(22) Filed: Aug. 1, 2001

(65) Prior Publication Data

US 2002/0025466 A1 Feb. 28, 2002

(30) Foreign Application Priority Data

Aug. 1, 2000 (DE) .......................................... 100 37 402

(51) Int. Cl.[7] .......................... H01M 8/04; H01M 8/12; H01M 2/00; H01M 2/02
(52) U.S. Cl. .......................................... 429/26; 429/34
(58) Field of Search .............................. 429/26, 17, 34; 204/524, 522, 533, 536; 210/263

(56) References Cited

U.S. PATENT DOCUMENTS

| | | |
|---|---|---|
| 5,425,858 A | 6/1995 | Farmer |
| 5,919,583 A * | 7/1999 | Grot et al. ................... 429/33 |
| 5,954,937 A | 9/1999 | Farmer |
| 5,980,716 A | 11/1999 | Horinouchi et al. |

FOREIGN PATENT DOCUMENTS

| | | |
|---|---|---|
| DE | 198 07 878 A1 | 8/1999 |
| DE | WO 9944249 * | 9/1999 |
| WO | 00/17951 | 3/2000 |

\* cited by examiner

*Primary Examiner*—Patrick Ryan
*Assistant Examiner*—Julian Mercado
(74) *Attorney, Agent, or Firm*—Crowell & Moring LLP

(57) ABSTRACT

A device for treating a fuel/coolant mixture in a fuel cell system. The fuel cell system is in particular a direct methanol fuel cell system. The fuel cell system is in particular a direct methanol fuel cell system. The fuel/coolant mixture circulates in a circuit system which has a mixture-conveying device, an anode chamber of a fuel cell and an ion exchanger. Furthermore, fuel is guided out of a tank into the circuit system via a line. In addition, a cation exchanger is arranged in the circuit system.

16 Claims, 2 Drawing Sheets

DEVICE FOR TREATING A FUEL/COOLANT MIXTURE

BACKGROUND AND SUMMARY OF THE INVENTION

This application claims the priority of German Patent Application No. 100 37 402.6, filed Aug. 1, 2000, the disclosure of which is expressly incorporated by reference herein.

The invention relates to a device for treating a fuel/coolant mixture in a fuel cell system.

A fuel cell system with an anode chamber and a cathode chamber is known from the German Patent Document DE 198 07 878 A1. The two chambers are separated from one another by a proton-conducting membrane, oxygen-containing gas being supplied to the cathode chamber and a liquid coolant/fuel mixture being supplied to the anode chamber. The anode chamber forms part of a circuit which also comprises a cooler, a gas separator and a pump. Moreover, this anode circuit of the fuel cell system is divided into a recirculation ring and a cooling ring. Moreover, fuel is passed into the circuit from a tank via a line.

In a further configuration, an ion exchanger is provided in the cooling ring upstream of the gas separator.

Since, in an application of this type, cations and anions are being removed from the coolant/fuel mixture, it is necessary, for example, for a strongly basic ion exchanger to be of correspondingly large design, in order not to become fully laden with the $CO_2$ which is usually entrained in a dissolved fashion in the liquid phase after even a very short operating time. Moreover, the temperatures which prevail in the mixture cause a problem, since commercially available and therefore inexpensive ion exchanger systems are not suitable for the operating temperatures which arise in a fuel cell system of this type. They therefore, in each case, require cooling of the mixture flowing through them before entry into the actual ion exchanger. Therefore, the ion exchanger cannot be positioned directly upstream of the anode chamber, which constitutes a drawback.

A system of similar structure, which likewise describes the treatment of water in a PAFC fuel cell system, is described in U.S. Pat. No. 5,980,716. This system has an ion exchanger device based on a resin ion exchanger and an electro-deionization system. Similar drawbacks to those already described above apply to this system too, but in this case a very complex degassing and filtration system, in which $CO_2$ and iron oxide occurring in the cooling water are removed before reaching the ion exchanger devices, is formed in order to solve the problem.

Moreover, U.S. Pat. No. 5,425,858 and, in a corresponding further development of this document, U.S. Pat. No. 5,954,937 describe a device for the capacitive deionization and electrochemical cleaning of matter flow. The structure of a device of this type includes cells which are stacked on top of one another and through which the flow of matter is passed. Each of the cells has two electrodes with a relatively large surface area. These electrodes are electrically connected in such a manner that a field is produced between them. The charged substances situated in the flow of matter are influenced accordingly by this field and are deflected towards the respective electrode. The flow of matter which leaves the installation has then had electrically conductive substances removed, because these substances remain behind on the individual electrodes.

It is an object of the invention to provide a device for treating a fuel/coolant mixture in a fuel cell system, which ensures that the ion concentration of the fuel/coolant mixture, which is at is at least partially circulating in a circuit system, remains below a level which is critical for a membrane in an anode chamber of a fuel cell of the fuel cell system.

Arranging an additional anion and cation exchanger in the line between the tank and the circuit system has the advantage that, despite the critical operating conditions, conventional ion exchangers can be used in the circuit system. The fuel available in the tank usually includes impurities. These impurities either originate from the production or pass into the fuel during transport or through the infrastructure. According to the invention, the fuel is completely cleaned even before it enters the circuit system. A low temperature level prevails in this line, so that there are no problems with the thermal load-bearing capacity of the ion exchangers. Moreover, the fuel has only very little or no dissolved $CO_2$, which contributes to a very long service life of the anion exchanger. Furthermore, only a small volumetric flow has to be cleaned, so that there are no problems with regard to pressure loss or mechanical durability. Finally, the complete cleaning of the fuel before it enters the circuit system enables a high level of purity to be achieved in the circuit system. Only very minor levels of impurity then occur in the circuit system itself and these can be removed with the aid of a cation exchanger arranged in the circuit system. Since, unlike anion exchangers, conventional cation exchangers are sufficiently able to withstand thermal loads, their positioning in the circuit system is not critical. A further advantage is that only a small ion exchanger is required in the circuit system.

The cation exchanger may either be arranged directly in the circuit system or alternatively in a bypass line. A position in a bypass line may be required in particular if even higher operating temperatures are used in fuel cell systems of the future. If a bypass line is provided, it is additionally also possible to provide an anion exchanger in the bypass line.

To reduce the temperatures in the ion exchanger to acceptable levels, it is moreover also possible for a cooling heat exchanger and/or a heating heat exchanger to be provided upstream or downstream, respectively, of the ion exchanger. In this way, the desired temperature can be maintained in the circuit system and, at the same time, the temperature in the ion exchanger can be reduced.

The fact that the ions have been removed from that part of the fuel/coolant mixture which is flowing in the bypass line and is then combined again with the principal stream of the circuit makes it possible to ensure that the ion concentration in the fuel/coolant mixture flowing in the principal stream is also reduced.

The controllable or regulable valve device enables the ratio of the volumetric flows between the principal stream and the bypass to be adjusted in such a manner that the reduction of the number of ions in the fuel/coolant mixture which is taking place in the bypass is sufficient to ensure that, in the circuit, there is no concentration of ions which could be critical for individual components of the circuit system, in particular a membrane in the anode chamber of the fuel cell. In a preferred configuration, the bypass volumetric flow is controlled or regulated as a function of the temperature of the fuel/coolant mixture.

Moreover, the position in the bypass line offers the advantage that the ion exchanger device can be relatively small, since the volumetric flow passing through it in the region of the bypass line is very low compared to the volumetric flow passing through the circuit as a whole.

The removal of the ionic substances from the fuel/coolant mixture leads to the particular advantage that it is possible to prevent deposits on the membrane which could lead to aging or destruction of the membrane. Moreover, in the presence of certain other substances, for example $CO_2$, the ions may form compounds which could precipitate out and cause corresponding contamination in the fuel cell system.

In an advantageous configuration of the invention, at least one of the ion exchangers is designed as a capacitive deionization system or as an electrodeionization system. These two alternative, advantageous refinements of the invention, as well as allowing the ions to be separated out, also allow at least partial removal of the $CO_2$ which is dissolved in the liquid in the form of carbonic acid. This in turn provides the advantage that the aggressiveness of the mixture, which rises on account of the dissolved $CO_2$ and may cause corrosion phenomena in the region of the fuel cell system, is reduced.

Moreover, reducing the conductive constituents in the fuel/coolant mixture results in further advantages because the conductivity of the mixture is reduced through the removal of the ions and of the dissolved $CO_2$, leading to a fall in the undesirable leakage currents in the fuel cell system.

The ion exchanger in the line between the tank and the circuit system is preferably designed as a mixed bed ion exchanger. However, it is also possible to provide two separate resin bed ion exchangers.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 1:
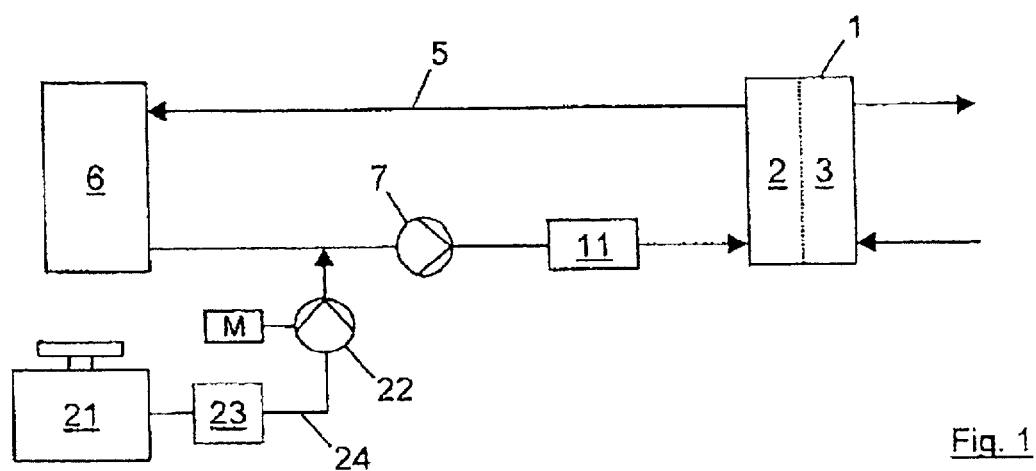
FIG. 1 shows a highly diagrammatic structure of the device according to the invention.

FIG. 1 shows a fuel cell 1 having an anode chamber 2 and a cathode chamber 3. An oxygen-containing gas, for example air, flows through the cathode chamber 3. The anode chamber 2 is separated from the cathode chamber 3 by a proton-conducting membrane. The functioning of the fuel cell 1 is of no further relevance to the invention and is therefore not explained in more detail.

The anode chamber 2 forms part of a circuit system 5, in which a fuel/coolant mixture is at least partially circulating, serving as fuel and as coolant. The fuels used may in particular be hydrocarbons or alcohols, for example methanol. The coolant used is preferably water.

The circuit system 5 has an expansion vessel 6, which is outlined here and which may moreover include a gas separator (not shown). Moreover, the circuit system 5 has a mixture-conveying device 7 or pump 7.

The entire structure in this case represents a fuel cell system, in particular a direct methanol fuel cell system (DMFC).

Furthermore, a tank 21 is provided, in which the fuel required is carried. Via a line 24, the fuel is conveyed into the circuit system 5 with the aid of a conveying and/or metering pump 22. This fuel is used to replace the fuel which has been consumed in the fuel cell 1 and therefore to keep the mixing ratio of the fuel/coolant mixture at a predetermined level. Furthermore, an anion and cation exchanger 23 is provided in the line 24. All the impurities are removed from the fuel with the aid of this anion and cation exchanger 23, so that the fuel has a very high level of purity when it enters the circuit system 5.

A mixed bed ion exchanger is preferably used. Alternatively, the anion and cation exchanger 23 may have at least one resin bed ion exchanger, which is designed as a cation exchanger, and at least one resin bed ion exchanger, which is designed as an anion exchanger. These are preferably strongly acidic resin bed ion exchangers. Moreover, it is also possible to use capacitive deionization (CDI) systems or electro-deionization (EDI) systems.

The choice of a suitable anion and cation exchanger 23 is scarcely restricted, since its arrangement in the line 24 has numerous advantages. For example, the temperature level in the line is lower than in the circuit system 5, so that there is no thermal load. Moreover, there is no or at least very little dissolved $CO_2$ in the fuel, which contributes to a greatly increased service life of the anion exchanger. Furthermore, once again compared to the circuit system, only a low volumetric flow has to be cleaned, so that there are no problems with regard to pressure loss or mechanical stability. Finally, a high level of purity can be achieved in the circuit system 5, since the fuel is supplied after virtually complete cleaning, and only relatively few impurities are formed in the circuit system.

To remove these impurities formed in the circuit system 5, a cation exchanger 11 is arranged directly in the circuit system S. This is possible since, unlike anion exchangers, cation exchangers can be operated even at relatively high temperatures. By way of example, the cation exchanger 11 may be designed as a resin bed ion exchanger.

Moreover, in accordance with the exemplary embodiment shown in FIG. 1, it is expedient if the cation exchanger 11 is designed either as a capacitive deionization (CDI) system or as an electro-deionization (EDI) system. These two types of deionization systems, which are known per se and in which the volumetric flow, to be deionized, passes through suitably arranged electric fields, by means of which the ions are then diverted to an appropriate electrode, offer the possibility that they are able to function fully irrespective of the type of ions and, in the case of CDI, to a large extent independently of the temperature of the flow of matter passing through them, i.e. in this case the fuel/coolant mixture. Moreover, designs with an EDI or a CDI allow at least parts of the $CO_2$ dissolved in the fuel/coolant mixture to be removed. This removal of the carbonic acid allows the aggressiveness of the fuel/coolant mixture with respect to line elements or the like to be reduced.

Figure 2:
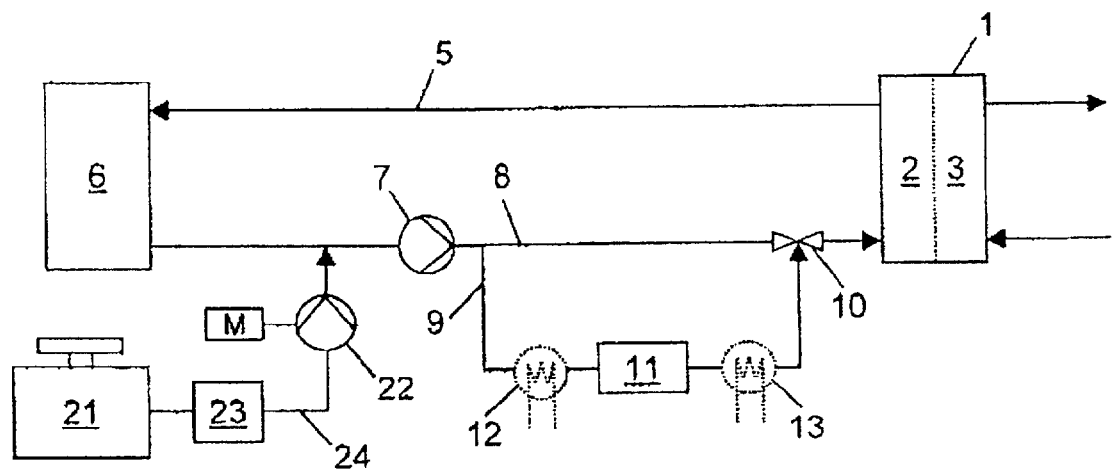
FIG. 2 shows a highly diagrammatic structure of the device according to the invention in an alternative embodiment.

A further exemplary embodiment is shown in FIG. 2, in which identical parts are denoted by identical reference numerals. Unlike in FIG. 1, downstream of the pump 7 the circuit system 5 is divided into a principal stream 8 and a bypass 9. In a valve device 10, the principal stream 8 and the bypass 9 are combined again and the circuit system leads back to the anode chamber 2 of the fuel cell 1.

In all the exemplary embodiments illustrated, the valve device 10 may be designed as a rotary slide valve which is actuated by an auxiliary drive and can be controlled or regulated by means of a computer unit or the like as a function of the required volumetric flows and/or as a function of the temperature of the fuel/coolant mixture.

The order of the components 2, 6, 7, 8 and 9 of the circuit 5 which is illustrated here by way of example may, of course, also be changed without affecting the basic principle of the invention. In accordance with FIG. 2, the cation exchanger 11 is arranged in the bypass line 9. An arrangement of this type has various advantages. Since the resin bed ion exchangers represent relatively complex structures, the resins of which have to be regenerated or exchanged from time to time, it is particularly expedient in this case that the cation exchanger 11 required can be very small, on account of the existence of the bypass 9. Moreover, it is possible that fuel cell systems of the future will be operated at higher temperatures. In this case, it may be necessary for a cooling heat exchanger 12 to be arranged upstream of the cation exchanger 11, as seen in the direction of flow. This heat exchanger cools the temperature of the volumetric flow which is flowing in the bypass 9 in such a manner that the corresponding cation exchanger 11 is able to operate without problems.

Moreover, the structure in accordance with FIG. 2 shows an optional heating heat exchanger 13 which, if appropriate, may follow the cation exchanger 11. This optional heating heat exchanger 13 is required if the volumetric flow downstream of the cation exchanger 11 needs to be heated again on account of the operating parameters required thereafter. Usually, however, there is no need for a heating heat exchanger 13 of this type, since the volumetric flow which passes through the bypass 9 is so low in relation to the principal stream 8 that the relatively slight reduction in the temperature of the overall volumetric flow, after the volumetric flow passing through the bypass 9 and the principal stream 8 have been combined again, is negligible. In principle, of course, it is also possible to provide corresponding cooling and/or heating heat exchangers 12, 13 in the principal stream 8. However, high cooling and/or heating capacities are required in this case.

Figure 3:
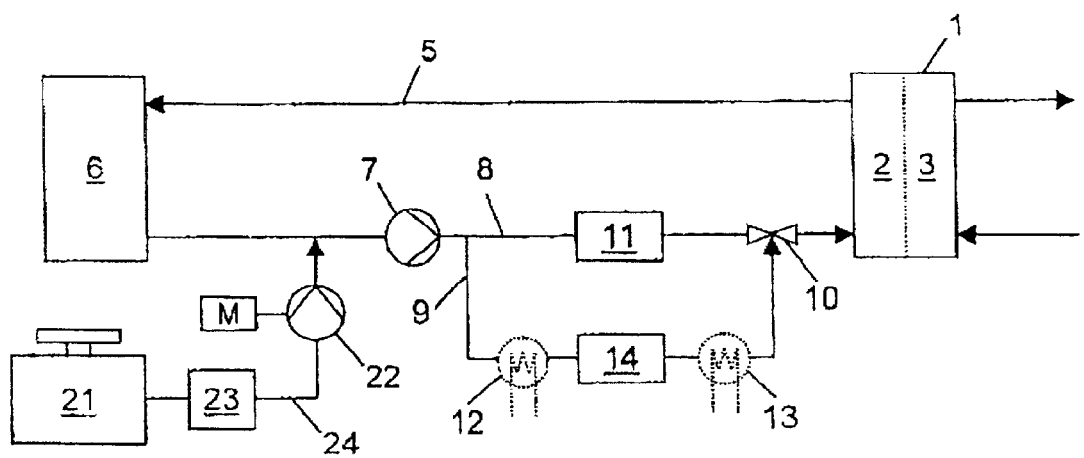
FIG. 3 shows a highly diagrammatic structure of the device according to the invention in a further alternative embodiment.

In the exemplary embodiment shown in FIG. 3, the cation exchanger 11 is once again arranged in the principal stream 8, while an additional anion exchanger 14 is provided in the bypass line 9. While the cation exchanger 11, as has been mentioned above, is able to withstand the temperature in the principal stream 8, the additional anion exchanger 14 may under certain circumstances have to be kept at a suitable temperature using corresponding cooling and heating heat exchangers 12, 13.

Figure 4:
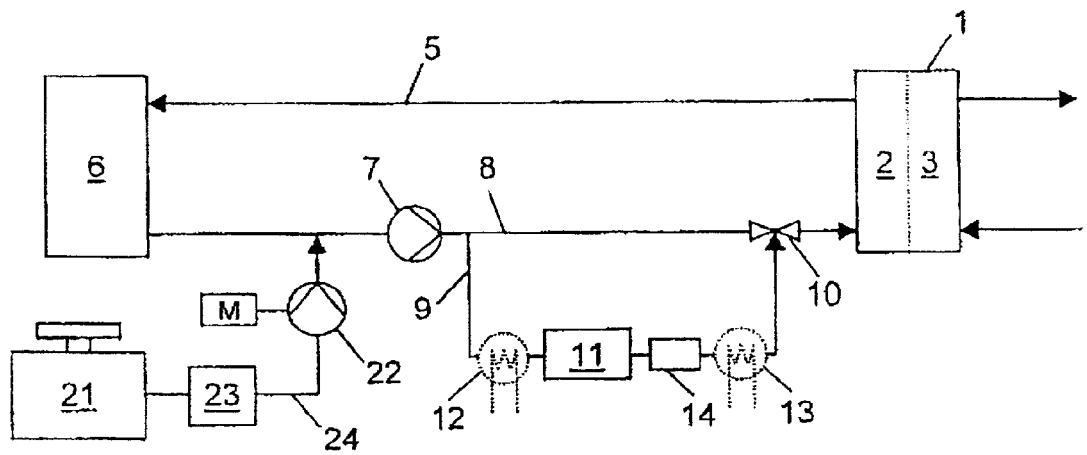
FIG. 4 shows a further embodiment of the device according to the invention.

Finally, in the exemplary embodiment shown in FIG. 4, both the cation exchanger 11 and the anion exchanger 14 are arranged in the bypass line 9. Alternatively, of course, it is also possible to provide a mixed bed resin exchanger which is able to eliminate both cations and anions from the volumetric flow. In this case too, suitable cooling and/or heating heat exchangers 12, 13 may be provided.

One important aspect of the invention is the fact that, as a result of an anion and cation exchanger 23 being arranged in the line 24 between tank 21 and circuit system 5, the fuel passed into the circuit system 5 is very pure. It is therefore sufficient for a cation exchanger 11, which is not critical with regard to the permissible temperature, to be provided in the circuit system 5 itself. Although an anion exchanger 14, which is critical with regard to its operating temperature, may additionally be provided in the bypass line 9, this is not absolutely imperative.

On account of the conditions in the line 24 not being critical, it is possible to use any type of anion and cation exchanger 23. It is preferable to use a mixed bed ion exchanger. However, the anion and cation exchanger 23 may also have at least one resin bed ion exchanger which is designed as a cation exchanger and at least one separate resin bed ion exchanger which is designed as an anion exchanger. Moreover, it is also possible to use capacitive deionization (CDI) systems or electro-deionization (EDI) systems.

Higher demands are imposed on the ion exchangers used in the circuit system 5. Therefore, a cation exchanger 11 which is designed as a resin bed ion exchanger is preferably provided in this case. On account of its temperature insensitivity, the CDI process may also be arranged directly in the principal stream.

By contrast, in principle any type of ion exchanger may be used in the bypass line 9. By way of example, it is also possible to use anion exchangers which are designed as resin bed ion exchangers or the EDI process. In the case of temperature-sensitive ion exchangers, however, the volumetric flow in the bypass line 9 must be regulated in such a way that no temperatures above the respective maximum permissible operating temperatures arise in this line ($V_{Bypass}=0$, if $T_{Medium} > T_{max.\ Op.}$). This can be achieved, for example, by means of temperature regulation of the valve device 10.

The forgoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for treating a fuel/coolant mixture in a direct methanol fuel cell system, the device comprising:
   a circuit system including at least one mixture conveying device, and an anode chamber of a fuel cell of the fuel cell system, and at least one cation exchanger, wherein the fuel/coolant mixture at least partially circulates in said circuit system;
   a tank for holding the fuel; and
   a line for feeding the fuel/coolant into the circuit system, said line including a combined anion and cation exchanger.

2. The device according to claim 1, wherein the cation exchanger is arranged in a bypass which runs parallel to a principal stream of the circuit, the principal stream and the bypass being combined again, downstream of the cation exchanger as seen in the direction of flow, by means of a controllable or regulateable valve device.

3. The device according to claim 2, wherein the valve device is controlled or regulated as a function of a temperature of the fuel/coolant mixture.

4. The device according to claim 2, wherein a cooling heat exchanger is arranged in the circuit, upstream of the separate ion exchanger as seen in the direction of flow.

5. The device according to claim 2, wherein a heating heat exchanger is ranged downstream of the separate ion exchanger as seen in the direction of flow.

6. The device according to claim 2, wherein the separate ion exchanger is designed as an electro-deionization system, as a capacitive deionization system or as at least one resin bed ion exchanger.

7. The device according to claim 1, wherein a separate anion exchanger is additionally arranged in a bypass which runs parallel to a principal stream of the circuit, the principal stream and the bypass being combined again, downstream of the cation exchanger and the separate anion exchanger as seen in the direction of flow, by means of a controllable or regulateable valve device.

8. The device according to claim 1, wherein a cooling heat exchanger is arranged in the circuit, upstream of the cation exchanger as seen in the direction of flow.

9. The device according to one of claim 1, wherein a heating heat exchanger is arranged downstream of the cation exchanger as seen in the direction of flow.

10. The device according to claim 1, wherein in the cation exchanger is designed as an electro-deionization (EDI) system, as a capacitive deionization (LDI) system or as at least one resin bed ion exchanger.

11. The device according to claim 1, wherein the combined anion and cation exchanger is designed as a mixed bed ion exchanger, as a capacitive deionization system or as an electrodeionization system.

12. The device according to claim 1, wherein the combined anion and cation exchanger has at least one resin bed ion exchanger, which is designed as a cation exchanger, and at least one resin bed ion exchanger, which is designed as an anion exchanger.

13. An arrangement for treating a fuel/coolant mixture in a fuel cell system comprising:
- at least one mixture-conveying device;
- an anode chamber of a fuel cell of the fuel cell system;
- at least one cation exchanger;
- a tank for holding the fuel and a line for feeding the fuel into the at least one mixture-conveying device;
- a combined anion and cation exchanger connected in said line between said tank and said at least one mixture-conveying device; and
- a separate anion exchanger arranged in a bypass which runs parallel to a principle stream of a circuit formed by said at least one mixture conveying device and said anode chamber wherein said principle stream and said bypass are combined downstream of one of the cation ion exchanger and the separate anion exchanger as seen in the direction of flow by means of a controllable valve device.

14. The arrangement according to claim 13, wherein a cooling heat exchanger is arranged upstream of the cation exchange as seen in the direction of flow.

15. The arrangement according to claim 13, further comprising a heating heat exchanger arranged downstream of the cation exchanger as seen in the direction of flow.

16. An arrangement for treating a fuel/coolant mixture in a fuel cell system comprising:
- at least one mixture-conveying device;
- an anode chamber of a fuel cell of the fuel cell system;
- at least one cation exchanger;
- a tank for holding the fuel and a line for feeding the fuel into the at least one mixture-conveying device;
- a combined anion and cation exchanger connected in said line between said tank and said at least one mixture-conveying device wherein the cation exchanger is arranged in a bypass which runs parallel to a principle stream of a circuit formed by said at least one mixture-conveying device and said anode chamber wherein the principle stream and the bypass are combined downstream of the cation exchanger as seen in the direction of flow, by means of a controllable valve device.

* * * * *